United States Patent
Fulghum et al.

(10) Patent No.: US 7,486,716 B2
(45) Date of Patent: Feb. 3, 2009

(54) METHOD AND APPARATUS FOR USING CHIP SAMPLE CORRELATIONS IN ONE OR MORE RECEIVED SIGNAL PROCESSING OPERATIONS

(75) Inventors: Tracy L. Fulghum, Durham, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 612 days.

(21) Appl. No.: 11/158,665

(22) Filed: Jun. 22, 2005

(65) Prior Publication Data

US 2006/0291543 A1 Dec. 28, 2006

(51) Int. Cl.
*H04B 1/00* (2006.01)

(52) U.S. Cl. ........................ 375/150; 375/142

(58) Field of Classification Search ................. 375/130, 375/142, 144, 147–148, 150; 370/335, 342, 370/441
See application file for complete search history.

(56) References Cited

U.S. PATENT DOCUMENTS

| | | | |
|---|---|---|---|
| 6,069,912 | A | 5/2000 | Sawahashi et al. |
| 6,363,104 | B1 | 3/2002 | Bottomley |
| 6,570,909 | B1 | 5/2003 | Kansakoski et al. |
| 2002/0051485 | A1 | 5/2002 | Bottomley |
| 2002/0080863 | A1 | 6/2002 | Nielsen |
| 2005/0190820 | A1* | 9/2005 | Heo ........................ 375/150 |
| 2006/0018367 | A1 | 1/2006 | Bui |

FOREIGN PATENT DOCUMENTS

WO 02/080379 10/2002

OTHER PUBLICATIONS

Hai, W. et al. "Approaches for Fast, Adaptive, Generalized RAKE Reception." Research Disclosure Journal, Kenneth Mason Publ. Ltd., UK. Research Disclosure Database No. 475041, Nov. 2003.

Sui, H. et al. "CDMA Downlink Chip-Level MMSE Equalization and Finger Placement." Proceeding of the 37th Asilomer Conference on Signals, Systems and Computers. Pacific Grove CA, Nov. 2003, vol. 1, pp. 1161-1165.

Ghosh, M. "Adaptive Chip-Equalizers for Synchronous DS-CDMA Systems with Pilot Sequences." IEEE 2001 Global Telecommunications Conference (GLOBECOM '01) Nov. 2001, vol. 6, pp. 3385-3389.

* cited by examiner

*Primary Examiner*—Jean B Corrielus
(74) *Attorney, Agent, or Firm*—Coats & Bennett, P.L.L.C.

(57) ABSTRACT

A wireless communication receiver obtains improved performance under certain fast fading conditions by basing one or more received signal processing operations on pre-despreading chip sample correlations rather than on post-despreading noise correlations, but preserves soft scaling information by determining one or more scaling factors that relate the chip sample correlations to the noise correlations. By way of non-limiting examples, a Generalized RAKE receiver circuit may base combining weight generation on chip sample correlations rather than on post-despreading pilot symbol noise correlations, but scale the combining weights as a function of the one or more scaling factors, or, equivalently, scale the combined values generated from the combining weights. Similar scaling may be performed with respect to chip equalization filter combining weights in a chip equalization receiver circuit. Further, Signal-to-Interference Ratio (SIR) estimation may be improved in terms of fast fading responsiveness by using chip sample correlations, while preserving the proper scaling.

33 Claims, 4 Drawing Sheets

METHOD AND APPARATUS FOR USING CHIP SAMPLE CORRELATIONS IN ONE OR MORE RECEIVED SIGNAL PROCESSING OPERATIONS

BACKGROUND OF THE INVENTION

The present invention generally relates to communication signal processing, and particularly relates to using chip sample correlations in one or more received signal processing operations.

Certain types of wireless communication receivers improve their reception performance through interference suppression. For example, a "Generalized" RAKE receiver (G-RAKE) mitigates interference in a received Code Division Multiple Access (CDMA) signal by incorporating knowledge of the noise covariance into the generation of RAKE combining weights that are used to RAKE combine despread values of the received signal. While structurally different than G-RAKE receivers, chip equalization receivers similarly suppress interference by incorporating knowledge of noise covariance into their generation of filter combining weights.

The interference of interest generally comprises those interference and noise components remaining after despreading, i.e., non-orthogonal interference and noise components that appear in the despread values obtained from the received CDMA signal. Thus, conventional approaches to interference suppression measure post-despreading noise correlations, and use the post-despreading noise correlation measurements to suppress interference. For example, a conventional G-RAKE receiver estimates noise correlations from pilot symbols obtained by despreading the received CDMA signal, and then generates data signal combining weights based in part on the noise correlations estimated from the pilot symbols.

However, one shortcoming of this approach to noise correlation estimation, often carried out by constructing a "noise covariance" matrix, stems from the relatively few number of pilot symbols available over a given time interval. For example, the Wideband CDMA standards define slotted transmissions of 0.667 ms duration, during which ten pilot symbols are received. Generally these ten symbols represent an insufficiently large base from which the receiver can obtain a generally good estimate. Averaging these single-slot estimates over multiple slots can reduce estimation error. However, under some reception conditions, such as in certain fast fading environments, this multi-slot averaging window simply is too wide to track rapidly changing channel conditions.

One approach to the above tracking problem involves the use of chip sample correlations calculated from chip samples of the received signal, rather than noise correlations calculated from despread pilot symbols. This approach offers advantages in fast fading environments because new chip samples generally are available at a much higher rate than are new pilot symbols—the ratio may be as high as 256-to-1. More data points in a shorter period of time means lower estimation error, while keeping the estimation window short to allow tracking of rapidly changing conditions. However, the use of chip sample correlations instead of noise correlations as estimated from despread pilot symbols "loses" soft scaling information that generally is needed for proper combining of data despread values, chip equalization filtering, Signal-to-Interference Ratio (SIR) calculations, etc.

SUMMARY OF THE INVENTION

In one aspect of the present invention, one or more received signal processing operations in a wireless communication receiver use chip sample correlations instead of post-despreading noise correlations, but are compensated via one or more scaling factors that reflect a relationship between the chip sample correlations and the noise correlations. One of the advantages of basing the received signal processing operation(s) on the chip sample correlations rather than the noise correlations is that the chip sample correlations better track certain fast fading conditions associated with wireless mobility.

Thus, in one embodiment of a wireless communication receiver, the receiver is configured for processing a received Code Division Multiple Access (CDMA) signal comprising a reference signal and a data signal. The receiver comprises one or more processing circuits configured to determine one or more scaling factors that relate chip sample correlations determined from chip samples of the received CDMA signal to noise correlations determined from despread values of the reference signal, and compensate one or more received signal processing operations that make use of the chip sample correlations for said relationship between the chip sample correlations and the noise correlations, based on the one or more scaling factors At least one embodiment of the processing circuits comprises a calculation circuit configured to determine the one or more scaling factors, and one or more scaling circuits configured to compensate the one more received signal processing operations based on the one or more scaling factors. The processing circuits may be configured to determine the scaling factor(s) based on measuring chip sample correlations and noise correlations over a given interval, expressing the noise correlations as a function of the chip sample correlations scaled by a first scaling factor and a channel estimate product scaled by a second scaling factor, and solving for at least one of the first and second scaling factors. Solving in this context may comprise a Least Squares Error (LSE) calculation, but is not limited to such calculations.

The one or more received signal processing operations may comprise any one or more of Generalized RAKE combining operations, chip equalization operations, and Signal-to-Interference (SIR) estimation operations, but these operations should be understood as non-limiting examples. For example, using the chip sample correlations for SIR estimation may comprise calculating a SIR value as a function of the chip sample correlations and a channel estimate, and then scaling the resultant SIR as a function of the one or more scaling factors.

As another example, using the chip sample correlations for generalized RAKE combining of despread values of the data signal may comprise generating generalized RAKE combining weights based on the chip sample correlations instead of the noise correlations. Those combining weights can be scaled as a function of the one or more scaling factors to account for the relationship between the chip sample correlations and the noise correlations, or the combined values generated from them can be scaled to account for the relationship.

Similarly, using the chip sample correlations for chip equalization of the received CDMA signal may comprise generating chip equalization filter combining weights based on the chip sample correlations. Those combining weights can be scaled as a function of the one or more scaling factors to account for the relationship between the chip sample correlations and the noise correlations, or the filtered (equalized) chip samples generated from them can be scaled to account for the relationship.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
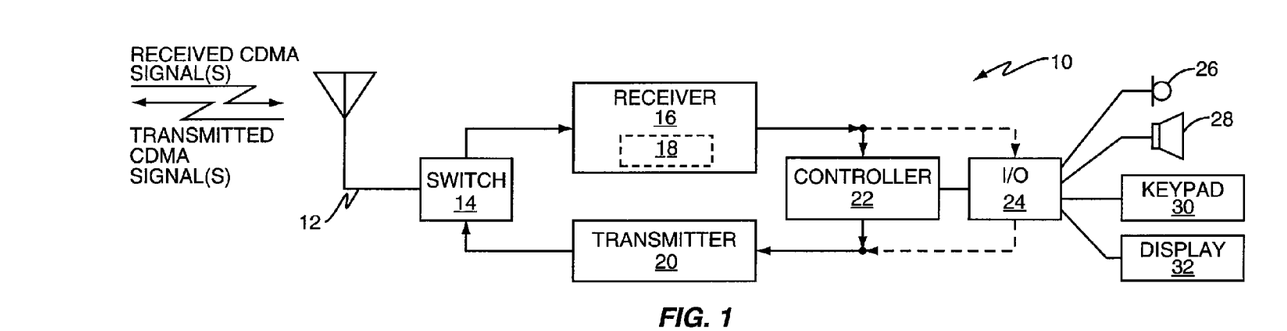
FIG. 1 is a block diagram of one embodiment of a wireless communication receiver.

FIG. 1 is a block diagram of an embodiment of a wireless communication receiver 10 that is configured to use chip sample correlations rather than post-despreading noise correlations in one or more of its received signal processing operations, and to compensate such operations to preserve soft-scaling information that otherwise would be lost with the use of chip sample correlations. By way of non-limiting example, the receiver 10 may comprise a cellular base station receiver. As another example, the receiver 10 actually may comprise a portable communication device that includes both receiver and transmitter functions, and may offer additional user interface functions, depending on its intended purpose.

In at least one embodiment, the wireless communication receiver 10 comprises a mobile station, or other type of portable communication device or handset, that is configured for use in a wireless communication network based on the W-CDMA standards. As such, the CDMA signal received by the wireless communication receiver 10 may comprise a composite signal that includes reference and data signals. For example, the received CDMA signal may include one or more traffic channel signals for data, and a Common Pilot Channel (CPICH) signal as a reference signal for channel estimation, etc.

With these examples in mind, the embodiment of the wireless communication receiver 10 illustrated in FIG. 1 comprises a transmit/receive antenna assembly 12, a switch (and/or duplexer) element 14, a receiver circuit 16, which includes one or more processing circuits 18 that are configured for soft scaling compensation as alluded to above, a transmitter circuit 20, a system controller 22, one or more Input/Output (I/O) interface circuits 24, a microphone 26, a speaker 28, a keypad 30, and a display screen 32. The processing circuit(s) 18 are referred to herein as the "compensation circuit" 18 for convenience, but it should be understood that the compensation functions may be implemented across several circuit elements, such that the compensation circuit 18 partially resides in each of two or more function circuits within the wireless communication receiver 10. Further, those skilled in the art will appreciate that some or all of the receiver circuit 16 may be implemented in one highly integrated processing circuit, or in a small number of such circuits, and that such implementation details will determine the particular manner in which the compensation circuit 18 is implemented.

In at least one embodiment, the receiver circuit 16 is configured as a "Generalized RAKE" receiver (G-RAKE). As a non-limiting example of G-RAKE processing, one may refer to U.S. Pat. No. 6,363,104 to Bottomley et al. In at least one other embodiment the receiver circuit 16 is configured as a chip equalizer receiver. In either case, the receiver circuit 16 may comprise a mix of analog and digital circuits, and includes baseband digital signal processing circuitry in at least one embodiment. Similarly, the transmitter circuit 20 may include a mix of analog and digital circuits, and includes baseband digital signal processing circuitry in at least one embodiment.

The system controller 22 may comprise a microprocessor, Digital Signal Processor (DSP), Field Programmable Gate Array (FPGA), Application Specific Integrated Circuit (ASIC), or other digital logic circuit, and may be implemented apart from the baseband processing circuits of the receiver and transmitter circuits 16 and 20, respectively, or may be integrated with such circuits. In either case, it should be understood that the wireless communication receiver 10 generally includes one or more memory devices, for storing default parameters, provisioning information, and program instructions for system control, signal processing, etc.

In general, the wireless communication receiver 10 uses pre-despreading chip sample correlations rather than post-despreading noise correlations in one or more of its processing operations involving the CDMA signal received by it. A conventional receiver generally would not use chip sample correlations, and instead might use a long-term estimate of the measured noise correlations obtained from despread pilot symbols. However, such long-term estimates lack the capability to track rapid changes in the channel conditions.

In contrast, the illustrated wireless communication receiver 10 uses chip sample correlations to track fast fading conditions, and uses (short term) post-despreading noise correlation measurements, i.e., noise correlation "snapshots," to maintain proper soft scaling. Thus, the wireless communication receiver 10 gains advantages through improved tracking of certain fast fading conditions, which are better reflected in the pre-despreading chip sample correlations as compared to post-despreading noise correlations, but preserves the soft scaling information generally needed for accurate data symbol decoding, SIR estimation, etc.

Figure 2:
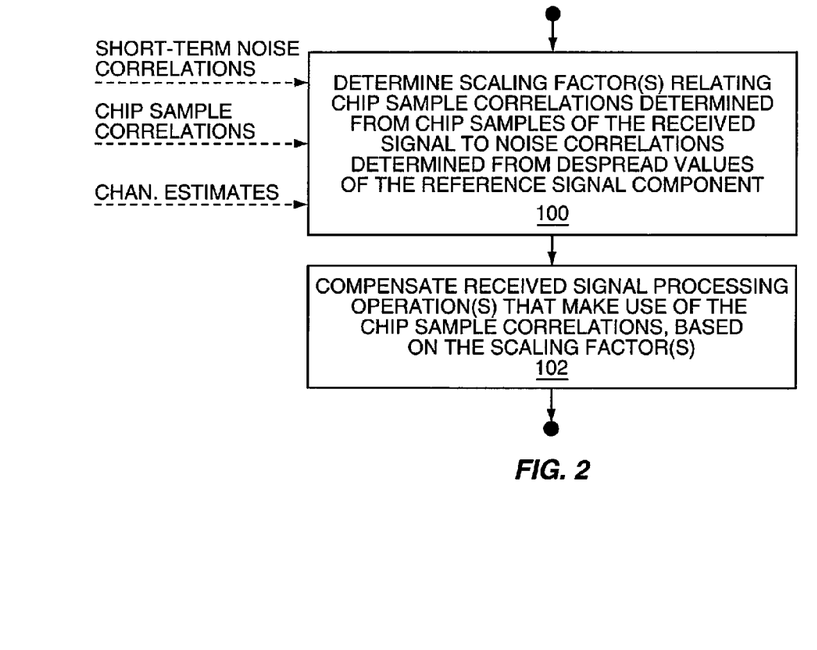
FIG. 2 is a logic flow diagram of one embodiment of processing logic that may be implemented in the wireless communication receiver of FIG. 1, for example.

With the above points in mind, and regardless of the particular type (or types) of processing circuits used to implement the wireless communication receiver 10, FIG. 2 illustrates one embodiment of processing logic implemented in the wireless communication receiver 10, for compensating received signal operations for the use of chip sample correlations. For a given interval of the received CDMA signal, which includes data and reference signal components, processing begins with the assumption that short-term noise correlations, R, are available based on measurements made from a set of despread reference signal values, e.g., from a set of despread pilot symbol values. Data despread values can also be used with detected symbol values to form a reference signal. The illustrated processing further assumes that a set of chip sample correlations, $R_d$, are available based on measurements made from a set of received signal chip samples taken over nearly the same received signal interval used for the short-term noise correlations, and that corresponding channel estimates, h, are available. Note that the discussion herein uses the term "correlation" broadly, and contemplates that the chip sample and noise correlations may be calculated as covariances. For example, R may be embodied as a noise covariance matrix measured using despread pilot symbols, and $R_d$ may be embodied as a chip sample covariance matrix measured using baseband chip samples of the received CDMA signal.

Continuing with processing details for the illustrated embodiment of processing logic, one or more processing circuits within the wireless communication receiver 10 determine one or more scaling factors that relate the pre-despreading chip sample correlations $R_d$, as obtained from chip samples of the received CDMA signal, to the post-despreading noise correlations R, as obtained from despread values of the reference signal included in the received CDMA signal (Step 100). As noted, the noise correlations R may be computed based on making short-term, "rough" measurements using despread pilot symbols, e.g., pilot symbol cross-correlation measurements made over, for example, one slot of a received W-CDMA signal. A greater or lesser time interval may be used as needed or desired.

With the one or more scaling factors thus determined, processing "continues" with the wireless communication receiver 10 compensating one or more received signal processing operations that make use of the chip sample correlations, as a function of the scaling factor(s) (Step 102). This processing logic, or variations of it, may be implemented as a computer program comprising stored program instructions within a memory device, or other computer readable medium or other storage element, included in the wireless communication receiver 10.

Regardless of whether the methods taught herein are implemented as hardware, software, or some combination thereof, one embodiment of the wireless communication receiver 10 includes a G-RAKE receiver circuit that is configured to compute its combining weights based on chip sample correlations, and is further configured to compensate either the combining weights, or the combined data signal samples generated from them, based on one or more scaling factors that relate the noise and/or interference components common to the pre-despreading chip sample correlations and the post-despreading noise correlations. Determining that relationship generally preserves substantially the same soft value information for the combined values that they would have had if generated directly from the noise correlations.

Figure 3:
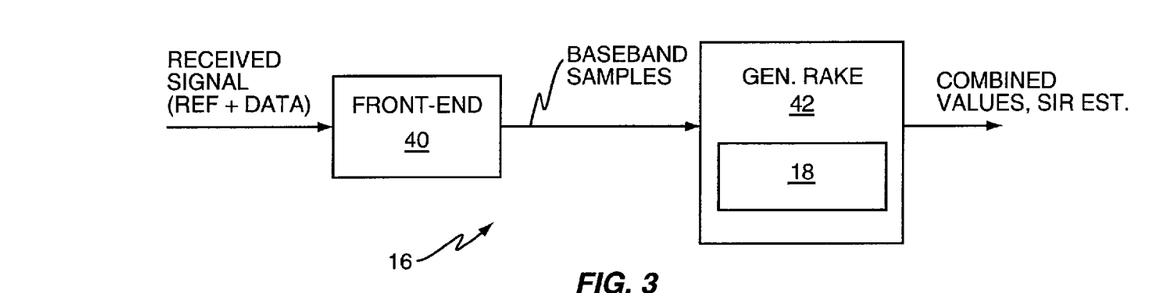
FIG. 3 is a block diagram of one embodiment of a Generalized (G-RAKE) receiver circuit that may be used in the wireless communication receiver of FIG. 1, for example.

FIG. 3 illustrates a G-RAKE embodiment of the wireless communication receiver 10, wherein its receiver circuit 16 comprises a receiver front-end 40, and a G-RAKE circuit 42. While not illustrated, it will be understood by those skilled in the art that the G-RAKE circuit 42 includes a plurality of correlation "fingers" (i.e., despreader circuits) that despread chip samples of the received CDMA signal to obtain despread values for the reference and traffic signals included in the received CDMA signal. For example, the G-RAKE circuit 42 may include a number of traffic channel despreader circuits to despread a traffic channel component of the received CDMA signal, and may include a number of despreader circuits to despread a pilot channel component of the received CDMA signal. Of more interest with respect to the present discussion, the G-RAKE circuit 42 includes, or is associated with, an embodiment of the compensation circuit 18 that is configured to compensate G-RAKE combining operations and/or compensate SIR estimation, for the use of chip sample correlations.

Figure 4:
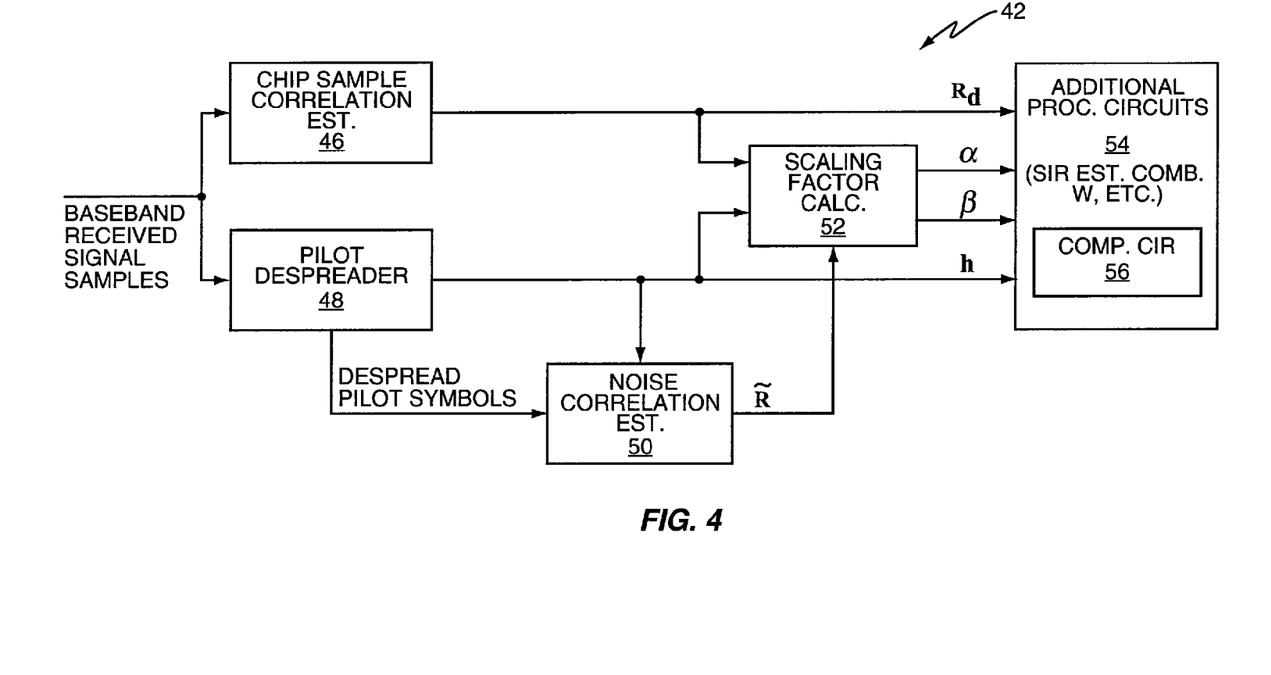
FIG. 4 is a block diagram of one embodiment of soft scaling compensation circuits that may be used with the G-RAKE receiver circuit of FIG. 3, for example.

More particularly, FIG. 4 illustrates a portion of the G-RAKE circuit 16 according to one or more embodiments of that circuit, wherein a chip sample correlation estimator 46 generates chip sample correlations, $R_d$, a pilot despreader 48 generates despread pilot symbols and channel estimates h, a noise correlation estimator 50 generates noise correlations R, and a scaling factor calculation circuit 52 calculates one or more scaling factors (e.g., "α" and "β") that relate $R_d$, R, and h. Further, one or more additional processing circuits 54 are configured for G-RAKE combining, SIR estimation, etc., and include one or more scaling circuits 56, which are configured to compensate at least one received signal processing operation that makes use of the chip sample correlations, as a function of the scaling factor(s).

In such configurations, the compensation circuit 18 illustrated in FIG. 3 may be considered as comprising the calculation circuit 52 and the scaling circuit(s) 56, although those circuits may be physically or functionally distributed within the larger context of the G-RAKE circuit 42, or the overall receiver circuit 16. In at least one embodiment, the compensation circuit 18 further includes the chip sample correlation estimator 46 and the noise correlation estimator 50, and also may include the channel estimator 48. In other embodiments, one or more of those elements are implemented apart from the compensation circuit 18, but are configured to provide their respective outputs to it.

Figure 5:
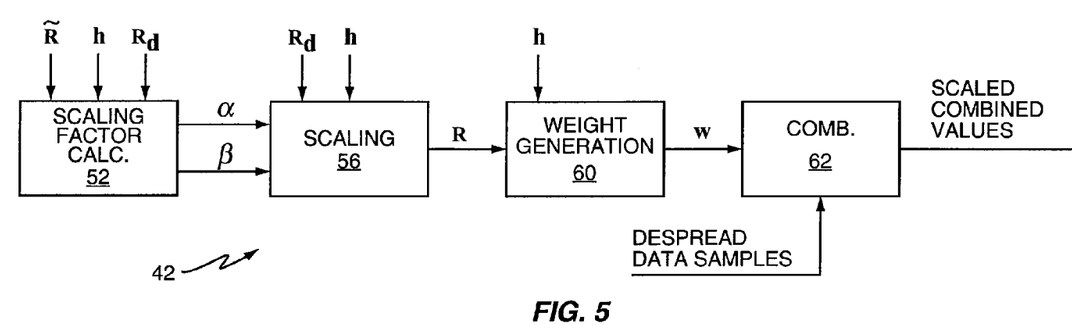
FIG. 5 is a block diagram of one embodiment of soft scaling compensation circuits for the generation of scaled G-RAKE combining weights.

FIG. 5 partially illustrates an embodiment of the G-RAKE circuit 42, wherein the calculation circuit 52 solves for the scaling factors, α and β, based on receiving as inputs the short-term noise correlations R, the channel estimates h, and the chip sample correlations $R_d$. The determination of both scaling factors may be determined using a Least Squares Error (LSE) estimation process involving the following expression:

$$\tilde{R} \approx \beta R_d - \alpha h h^H. \quad\quad\quad (\text{Eq. 1})$$

The scaling factor β may be thought of as a "conversion" scaling factor relating the reference and data signals included within the received CDMA signal. In some embodiments, the scaling factor β may be based on a scaling relationship known by design, and stored as a configured value within the wireless communication receiver 10. Knowing β simplifies the solution for α, which may be thought of as a "signal" scaling factor.

According to a natural language description of Eq. 1, solving for the two scaling factors α and β comprises measuring chip sample correlations ($R_d$) and noise correlations (R) over a given interval, expressing the noise correlations as a function of the chip sample correlations scaled by a first scaling factor (β) and a channel estimate product ($hh^H$) scaled by a second scaling factor (α), and solving for at least one of the first and second scaling factors. In one embodiment, solving for the first and second scaling factors comprises Least Squares Error (LSE) processing, with the chip sample correlations, the noise correlations, and the channel estimate known by measurement.

In looking at a LSE solution in more detail, it will be appreciated that Eq. 1 essentially relates the individual elements of the involved matrices, indexed by (i, j), according to, $$\tilde{R}(i,j) \approx \beta R_d(i,j) - \alpha H(i,j), \quad \text{(Eq. 2)}$$

where $H = hh^H$. Given that these are square matrices, say N×N, there are $N^2$ elements in each matrix, resulting in up to $N^2$ equations in the form of Eq. 2. There likely is no $\alpha$ and $\beta$ that truly makes each such equation exactly equal, but LSE processing does yield the scaling factor values that result in the least amount of squared error among the set of all such equations.

A matrix equation useful for LSE processing may be expressed as, $$\begin{bmatrix} \tilde{R}(1,1) \\ \tilde{R}(1,2) \\ \vdots \\ \tilde{R}(N,N) \end{bmatrix} = \begin{bmatrix} R_d(1,1) & -H(1,1) \\ R_d(1,2) & -H(1,2) \\ \vdots & \vdots \\ R_d(N,N) & -H(N,N) \end{bmatrix} \begin{bmatrix} \alpha \\ \beta \end{bmatrix}. \quad \text{(3)}$$

In simplified form, Eq. 3 may be expressed as, $$p \approx Ax, \quad \text{(Eq. 4)}$$

where, $$p = \begin{bmatrix} \tilde{R}(1,1) \\ \tilde{R}(1,2) \\ \vdots \\ \tilde{R}(N,N) \end{bmatrix}, \quad \text{(Eq. 5)}$$

$$A = \begin{bmatrix} R_d(1,1) & -H(1,1) \\ R_d(1,2) & -H(1,2) \\ \vdots & \vdots \\ R_d(N,N) & -H(N,N) \end{bmatrix},$$

and $$x = \begin{bmatrix} \alpha \\ \beta \end{bmatrix}.$$

Because $\alpha$ and $\beta$ are purely real (not complex), it is preferred to treat each complex equation as two real equations so that A and p are real.

The order of rows for Eq. 5 is not important. Indeed, because the original matrices are Hermitian symmetric, almost half of the rows repeat in each matrix (albeit, as complex conjugates). Since the repeated rows do not add any information to the solution, LSE processing may omit them, thereby reducing the number of computations needed. Further, it may be sufficient in some embodiments simply to calculate a LSE solution using the matrix diagonals.

In any case, whether or not a reduced size is used, an example LSE solution for Eq. 4 is given as, $$x = (A^T A)^{-1} A^T p. \quad \text{(Eq. 6)}$$

If $\beta$ is known, the wireless communication receiver 10 may be configured to express the LSE problem as, $$\beta R_d - \tilde{R} \approx \alpha H, \quad \text{(Eq. 7)}$$

which redefines A and x as, $$p = \begin{bmatrix} G(1,1) \\ G(1,2) \\ \vdots \\ G(N,N) \end{bmatrix}, \quad \text{(Eq. 8)}$$

$$A = \begin{bmatrix} H(1,1) \\ H(1,2) \\ \vdots \\ H(N,N) \end{bmatrix}, \text{ and}$$

$$x = [\alpha],$$

where $$G = \beta R_d - \tilde{R}. \quad \text{(Eq. 8A)}$$

In addition to the above details for implementing a LSE solution in one or more embodiments of the wireless communication receiver 10, it should be noted that the first and second scaling factors might be smoothed or otherwise maintained as averages for improved soft value scaling. Thus, in one embodiment, the wireless communication receiver 10 is configured to maintain average scaling factors as, $$\alpha_{AVG} = \gamma \alpha_{AVG} + (1-\gamma)\alpha, 0 \leq \gamma \leq 1,$$

$$\beta_{AVG} = \gamma \beta_{AVG} + (1-\gamma)\beta. \quad \text{(Eqs. 9, 10)}$$

In the expressions immediately above, the non-subscripted scaling factors represent the most recently obtained calculation, such that the averaged scaling factors are updated according to ongoing measurements.

The averaged scaling factors $\alpha_{AVG}$ and $\beta_{AVG}$ may be used to obtain a "synthesized" noise correlation matrix, R'. In turn, R' may be used to generate the combining weights, w, that incorporate the correct soft value scaling by virtue of being generated from R'. Synthesizing the noise correlation matrix R' may be carried out by the scaling circuit 56, based on the averaged scaling factors $\alpha_{AVG}$ and $\beta_{AVG}$. Those averaged scaling factors may be generated by the scaling circuit 56, or by the calculation circuit 52. In either case, generation of R' may be expressed as, $$R' = \beta_{AVG} R_d - \alpha_{AVG} hh^H \quad \text{(Eq. 11)}$$

The combining circuit 62 is configured to receive the properly scaled combining weights w, and use them to generate combined values from despread samples of the reference signal. Because R' was used to generate the combining weights w, these combined values will have substantially the same soft value information they would have if generated from properly smoothed, post-despreading noise correlations.

Figure 6:
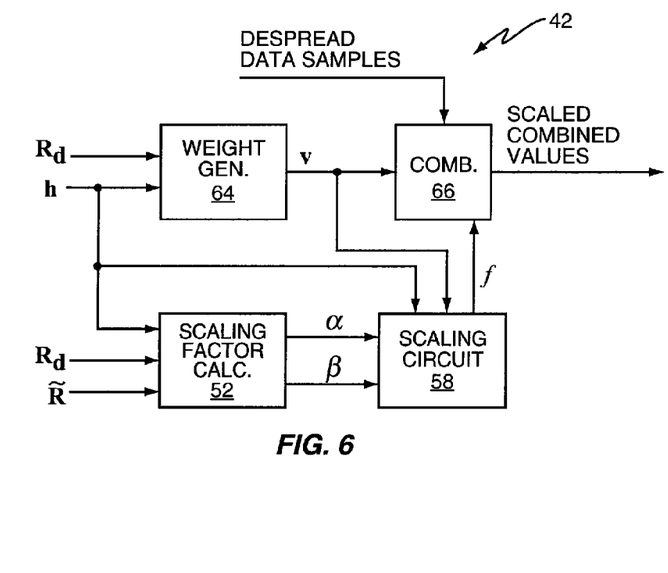
FIG. 6 is a block diagram of one embodiment of soft scaling compensation circuits for the generation of scaled combined values in a G-RAKE combining process.

FIG. 6 partially illustrates another embodiment of the G-RAKE circuit 42, wherein non-scaled combining weights, v, are generated from the chip sample correlations $R_d$ by a combining weight generator 64. The non-scaled combining weights may be generated as, $$v = R_d^{-1} h, \quad \text{(Eq. 12)}$$

where it is understood that matrix inversion is not an absolute necessity, and the weights may be obtained through practical means such as the Gauss-Seidel algorithm.

The scaling circuit 58 may use the scaling factors $\alpha$ and $\beta$, or their averages to compute a real-valued scaling factor f, that is used to compensate the RAKE combining operations of the combining circuit 66. For example, f may be generated as, $$f = \frac{1}{\beta_{AVG} - \alpha_{AVG}h^H v}. \qquad \text{(Eq. 13)}$$

To the extent that the channel estimate h and/or the combining weights v may be noisy, such noise can be mitigated by calculating f as, $$f = \frac{1}{\beta_{AVG} - \lambda\alpha_{AVG}h^H v}, \qquad \text{(Eq. 14)}$$

where λ is a "de-emphasizing" parameter defined as 0≦λ≦1, and where the calculated value of f may be clipped or otherwise limited such that it never goes negative. (A negative value of f would "invert" the sign of the data signal's symbol soft value information.)

With the above generation of the scaling factor f, from the scaling factors α and β, the combining circuit 66 may be configured to create combining weights w, having the proper soft scaling information, and then use those combining weights to generate combined values from the despread samples of the data signal. Alternatively, the combining weight generator 64 can be configured to use the non-scaled combining weights v to generate the combined values, and then scale those combined values as a function of f.

For the first case, scaled combining weights w can be generated from the non-scaled combining weights v, using the expression w=f·v. In the second case, assuming each combined value of the data signal is represented as χ, the value can be scaled using the expression, $\chi_{SCALED}=f\cdot\chi$. A third option is to scale despread values prior to combining, while yet a fourth option is to scale the chip samples. In any case, the combining circuit 66 outputs properly scaled combined values suitable for further processing, such as decoding, etc.

Figure 7:
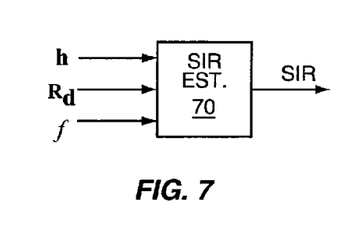
FIGS. 7 and 8 are block diagrams of two embodiments of a SIR estimation circuit that may be used in the wireless communication receiver of FIG. 1, for example.

Of course, it should be understood that other received signal processing operations additionally or alternatively might be compensated for the relationship between chip sample correlations and noise correlations. For example, FIG. 7 illustrates a SIR estimation circuit 70 that is configured to calculate a SIR estimate for the received CDMA signal, or for the data signal component of it, in particular, based on using the chip sample correlations $R_d$.

In the illustrated embodiment, the SIR estimation circuit 70 receives as inputs the channel estimates h, the chip sample correlations $R_d$, and the real-valued scaling factor f. The SIR estimation circuit 70 is configured to use these input terms to calculate a SIR estimate that is responsive to changing fast fading conditions, and is based on proper soft value information. For example, the SIR estimation carried out by the SIR estimation circuit 70 may be expressed as, $$SIR=f\cdot h^H R_d^{-1} h, \qquad \text{(Eq. 15)}$$

Figure 8:
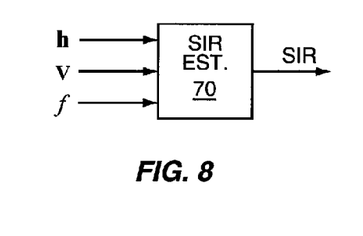

Note that FIG. 8 illustrates an alternative embodiment, wherein the SIR estimation circuit 70 makes a similarly compensated SIR calculation, but uses the unscaled combining weights v, the channel estimates h, and the chip sample correlations $R_d$, to compute the SIR estimate.

In discussion of SIR estimation as an example of one type of received signal processing operation that may be compensated for the use of chip sample correlations, it should be noted that the wireless communication receiver 10 may be configured to use noise sample correlations for one or more of its received signal processing operations, and may use chip sample correlations for one or more other received signal processing operations. For example, G-RAKE processing operations may be based on noise correlations obtained from pilot symbols, while SIR estimation may be based on chip sample correlations obtained from baseband chip samples of the received CDMA signal, or vice versa.

As such, the time periods over which the chip sample and noise correlations are taken may be different with respect to different received signal processing operations. Indeed, the G-RAKE processing operations may use different channel estimates, different noise correlations, etc., than are used for SIR estimation. One factor in deciding whether a particular received signal processing operation should use chip sample correlations rather than the more conventional noise sample correlations relates to an assessment of whether that process would benefit from such use. For example, SIR estimation may need to track fast fading conditions with a high degree of responsiveness in certain types of wireless communication networks, while G-RAKE combining may be more tolerant of changing conditions, and may perform well with the more traditional use of noise correlations.

Figures 9, 10:
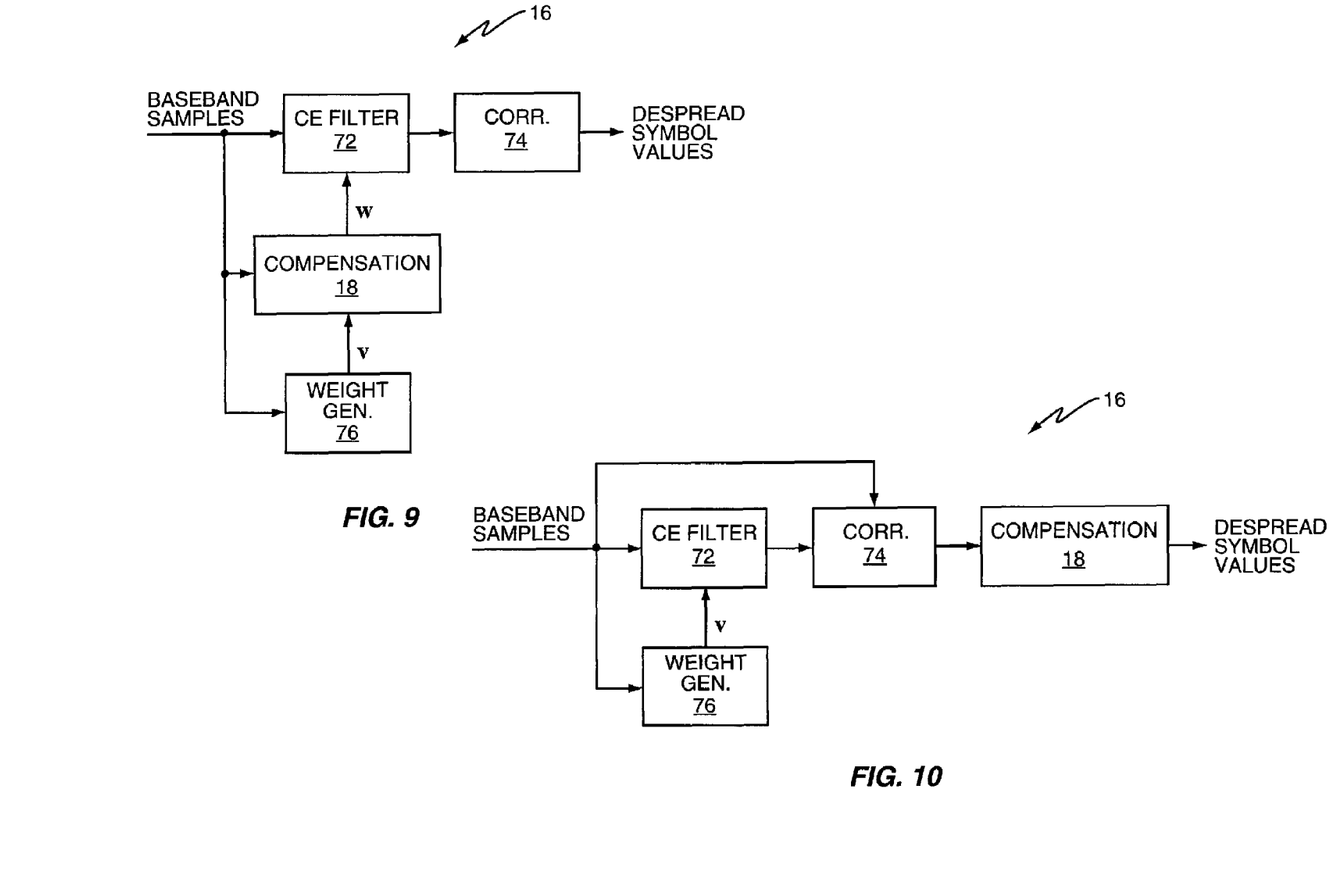
FIGS. 9 and 10 are block diagrams of two embodiments of a chip equalization circuit that may be used in the wireless communication receiver of FIG. 1, for example.

In any case, it should be understood that the methods taught herein may be selectively applied to particular received signal operations. Moreover, it should be understood that a variety of receiver architectures beyond G-RAKE embodiments may be adapted according to the methods taught herein. For example, FIG. 9 illustrates an embodiment of the wireless communication receiver 10, wherein its receiver circuit 16 is configured according to a chip equalization architecture. Thus, the partially illustrated receiver circuit 16 comprises a chip equalization filter 72, a correlator 74, and a combining weight generator 76, and further includes an embodiment of the previously discussed compensation circuit 18.

According to the illustrated embodiment of the receiver circuit 16, the combining weight generator 76 generates unscaled chip equalization filter combining weights v, based on chip sample correlations of the received CDMA signal. The compensation circuit 18 generates scaled combining weights w a function of the scaling factors α and β, or as a function of the real-valued scaling factor f, as derived from them. The chip equalization filter 72 thus uses properly scaled combining weights, such that the filtered values of the received CDMA signal output by it have the proper soft scaling. Of course, it should be understood that some supporting circuits, such as channel estimators, chip sample, and noise correlation estimators, etc., are not illustrated in FIG. 9 for brevity.

As an alternative to scaling the chip equalization filter combining weights, FIG. 10 illustrates a chip equalizer architecture that disposes one or more elements of the compensation circuit 18 on the output of the correlator 74. Thus, in this embodiment, the chip equalization filter 72 uses the unscaled combining weights v for chip equalization of the received CDMA signal. Proper soft scaling information is then imposed on the despread symbol values by the compensation circuit 18, as a function of the scaling factors α and β, or as a function of the real-valued scaling factor f, as derived from them. Other alternatives, not shown, are to apply scaling at either the input or the output of the chip equalization filter 72. Scaling applied before the chip equalization filter 72 could even be implemented in the gain adjustments applied by the automatic gain control (AGC) process of the receiver.

Thus, in one or more chip equalization embodiments, compensating the one or more received signal processing operations comprises compensating a chip equalization process used to equalize the received CDMA signal for said proportional relationship. By way of non-limiting examples, compensating the chip equalization process comprises one of (a) scaling chip equalization filter combining weights as a function of the one or more scaling factors, (b) scaling filtered values of the received CDMA signal as output from a chip equalization filter as a function of the one or more scaling factors, (c) scaling the despread symbol values as a function of the one or more scaling factors, or (d) scaling the chip samples as a function of the one or more scaling factors.

Of course, as described earlier herein, compensating one or more received signal processing operations may comprise compensating a combining process (e.g., a RAKE combining process) that is used to combine despread values of the data signal for said relationship. By way of non-limiting examples, compensating the combining process may comprise one of (a) scaling combining weights as a function of the one or more scaling factors, (b) scaling combined values of the data signal as a function of the one or more scaling factors, (c) scaling data despread values as a function of the one or more scaling factors, or (d) scaling the chip samples as a function of the one or more scaling factors.

Thus, with the above chip equalization and G-RAKE embodiments in mind, those skilled in the art will appreciate that the present invention applies to a wide range of receiver architectures, and to a wide range of received signal processing operations. While the particular values or terms subject to scaling may vary between these different architectures, and between these different processing operations, all such variations are based broadly on the generation of one or more scaling factors that relate chip sample correlations to noise correlations, for the preservation of soft scaling information. As such, the present invention is not limited by the foregoing discussion, nor is it limited by the accompanying drawings. Instead, the present invention is limited only by the following claims, and their legal equivalents.

What is claimed is:

1. A method in a wireless communications receiver of processing a received Code Division Multiple Access (CDMA) signal comprising a reference signal and a data signal, the method comprising:
   determining one or more scaling factors reflecting a relationship between chip sample correlations determined from chip samples of the received CDMA signal and noise correlations determined from despread values of the reference signal; and
   compensating one or more received signal processing operations for the relationship between the chip sample correlations and the noise correlations, using the one or more scaling factors.

2. The method of claim 1, wherein determining the one or more scaling factors comprises measuring chip sample correlations and noise correlations over a given interval, expressing the noise correlations as a function of the chip sample correlations scaled by a first scaling factor and a channel estimate product scaled by a second scaling factor, and solving for at least one of the first and second scaling factors.

3. The method of claim 2, wherein solving for at least one of the first and second scaling factors comprises solving for the second scaling factor with the first scaling factor set to a pre-configured value.

4. The method of claim 2, wherein solving for at least one of the first and second scaling factors comprises solving for the first and second scaling factors based on Least Squares Error (LSE) processing, with the chip sample correlations, the noise correlations, and the channel estimate known by measurement.

5. The method of claim 2, wherein the chip sample correlations reflect a first energy component associated with desired symbols in the data signal, a second energy component associated with interference that is substantially cancelled by despreading, and a third energy component associated with interference that is not substantially cancelled by despreading.

6. The method of claim 5, wherein expressing the noise correlations as a function of the chip sample correlations scaled by a first scaling factor and a channel estimate product scaled by a second scaling factor comprises expressing the noise correlations as a difference between the chip sample correlations scaled by the first scaling factor and the channel estimate product scaled by the second scaling factor, said difference representing energy components common to the noise correlations and to the chip sample correlations.

7. The method of claim 1, wherein compensating the one or more received signal processing operations comprises compensating a combining process used to combine despread values of the data signal for said relationship.

8. The method of claim 7, wherein compensating the combining process comprises one of (a) scaling combining weights as a function of the one or more scaling factors, (b) scaling combined values of the data signal as a function of the one or more scaling factors, (c) scaling data despread values as a function of the one or more scaling factors, or (d) scaling the chip samples as a function of the one or more scaling factors.

9. The method of claim 1, wherein compensating the one or more received signal processing operations comprises compensating a chip equalization process used to equalize the received CDMA signal for said relationship.

10. The method of claim 9, wherein compensating the chip equalization process comprises one of (a) scaling chip equalization filter combining weights as a function of the one or more scaling factors, (b) scaling filtered values of the received CDMA signal as output from a chip equalization filter as a function of the one or more scaling factors, (c) scaling the despread symbol values as a function of the one or more scaling factors, or (d) scaling the chip samples as a function of the one or more scaling factors.

11. The method of claim 1, wherein compensating the one or more received signal processing operations comprises calculating a Signal-to-Interference Ratio (SIR) for the received CDMA signal based on the chip sample correlations, and scaling the SIR as a function of the one or more scaling values.

12. A wireless communication receiver configured for processing a received Code Division Multiple Access (CDMA) signal comprising a reference signal and a data signal, said wireless communication receiver comprising one or more processing circuits configured to:
   determine one or more scaling factors reflecting a relationship between chip sample correlations determined from chip samples of the received CDMA signal and noise correlations determined from despread values of the reference signal; and
   compensate one or more received signal processing operations for the relationship between the chip sample correlations and the noise correlations, using the one or more scaling factors.

13. The wireless communication receiver of claim 12, wherein the one or more processing circuits comprises a calculation circuit configured to determine the one or more scaling factors, and one or more scaling circuits configured to compensate the one more received signal processing operations based on the one or more scaling factors.

14. The wireless communication receiver of claim 12, wherein the one or more processing circuits are configured to measure chip sample correlations and noise correlations over a given interval, express the noise correlations as a function of the chip sample correlations scaled by a first scaling factor and a channel estimate product scaled by a second scaling factor, and solve for at least one of the first and second scaling factors.

15. The wireless communication receiver of claim 14, wherein the one or more processing circuits are configured to solve for the second scaling factor as an unknown value, with the first scaling factor set to a pre-configured value.

16. The wireless communication receiver of claim 14, wherein the one or more processing circuits are configured to solve for the first and second scaling factors based on Least Squares Error (LSE) processing, with the chip sample correlations, the noise correlations, and the channel estimate product known.

17. The wireless communication receiver of claim 14, wherein the chip sample correlations reflect a first energy component associated with desired symbols in the data signal, a second energy component associated with interference that is substantially cancelled by despreading, and a third energy component associated with interference that is not substantially cancelled by despreading.

18. The wireless communication receiver of claim 17, wherein the one or more processing circuits are configured to express the noise correlations as a difference between the chip sample correlations scaled by the first scaling factor and the channel estimate product scaled by the second scaling factor, said difference representing energy components common to the noise correlations and to the chip sample correlations.

19. The wireless communication receiver of claim 12, wherein the one or more processing circuits are configured to compensate a combining process used to combine despread values of the data signal for said relationship.

20. The wireless communication receiver of claim 19, wherein the one or more processing circuits are configured to compensate the combining process by one of (a) scaling combining weights as a function of the one or more scaling factors, said combining weights generated from the chip sample correlations, (b) scaling combined values of the data signal as a function of the one or more scaling factors, said combined values generated by a combining circuit whose combining weights were generated from the chip sample correlations, (c) scaling data despread values as a function of the one or more scaling factors, or (d) scaling the chip samples as a function of the one or more scaling factors.

21. The wireless communication receiver of claim 12, wherein the one or more processing circuits are configured to compensate a chip equalization process used to equalize the received CDMA signal for said relationship.

22. The wireless communication receiver of claim 21, wherein the one or more processing circuits are configured to compensate the chip equalization process by one of (a) scaling chip equalization filter combining weights as a function of the one or more scaling signals, said chip equalization filter combining weights generated from the chip sample correlations, (b) scaling filtered values of the received CDMA signal as a function of the one or more scaling factors, said filtered values generated by a chip equalization filter whose combining weights were generated from the chip sample correlations, (c) scaling the despread symbol values as a function of the one or more scaling factors, or (d) scaling the chip samples as a function of the one or more scaling factors.

23. The wireless communication receiver of claim 12, wherein the one or more processing circuits are configured to compensate a Signal-to-Interference Ratio (SIR) calculation process by scaling a SIR value calculated from the chip sample correlations.

24. A computer-readable medium storing a computer program for a wireless communication receiver that is configured for processing a received Code Division Multiple Access (CDMA) signal comprising a reference signal and a data signal, said computer program comprising:
  program instructions to determine one or more scaling factors reflecting a relationship between chip sample correlations determined from chip samples of the received CDMA signal and noise correlations determined from despread values of the reference signal; and
  program instructions to compensate one or more received signal processing operations for the relationship between the chip sample correlations and the noise correlations, using the one or more scaling factors.

25. The computer-readable medium of claim 24, wherein the program instructions to compensate one or more received signal processing operations comprise program instructions to compensate a Generalized RAKE (G-RAKE) combining process by scaling G-RAKE combining weights as a function of the one or more scaling factors, wherein said G-RAKE combining weights are determined from the chip sample correlations.

26. The computer-readable medium of claim 24, wherein the program instructions to compensate one or more received signal processing operations comprise program instructions to compensate a Generalized RAKE (G-RAKE) combining process by scaling combined values as a function of the one or more scaling factors, said combined values being generated from G-RAKE combining weights determined from the chip sample correlations.

27. The computer-readable medium of claim 24, wherein the program instructions to compensate one or more received signal processing operations comprise program instructions to compensate a chip equalization process by scaling chip equalization filter combining weights as a function of the one or more scaling factors, wherein said chip equalization filter combining weights are determined from the chip sample correlations.

28. The computer-readable medium of claim 24, wherein the program instructions to compensate one or more received signal processing operations comprise program instructions to compensate a chip equalization process by scaling filtered values as a function of the one or more scaling factors, said filtered values being generated from chip equalization filter combining weights determined from the chip sample correlations.

29. The computer-readable medium of claim 24, wherein the program instructions to compensate one or more received signal processing operations comprise program instructions to compensate a Signal-to-Interference Ratio (SIR) estimation process as a function of the one or more scaling factors, wherein said SIR estimation process uses chip sample correlations to compute a SIR estimate.

30. The computer readable medium of claim 24, wherein the program instructions to compensate the one or more received signal processing operations comprise program instructions to compensate a combining process used to combine despread values of the data signal for said relationship.

31. The computer readable medium of claim 30, wherein the program instructions to compensate the combining process comprise one of (a) program instructions to scale combining weights as a function of the one or more scaling factors, (b) program instructions to scale combined values of the data signal as a function of the one or more scaling factors, (c)

program instructions to scale data despread values as a function of the one or more scaling factors, or (d) program instructions to scale the chip samples as a function of the one or more scaling factors.

32. The computer readable medium of claim 24, wherein the program instructions to compensate the one or more received signal processing operations comprise program instructions to compensate a chip equalization process used to equalize the received CDMA signal for said relationship.

33. The computer readable medium of claim 32, wherein the program instructions to compensate the chip equalization process comprises one of (a) program instructions to scale chip equalization filter combining weights as a function of the one or more scaling factors, (b) program instructions to scale filtered values of the received CDMA signal as output from a chip equalization filter as a function of the one or more scaling factors, (c) program instructions to scale the despread symbol values as a function of the one or more scaling factors, or (d) program instructions to scale the chip samples as a function of the one or more scaling factors.

* * * * *

UNITED STATES PATENT AND TRADEMARK OFFICE
CERTIFICATE OF CORRECTION

PATENT NO. : 7,486,716 B2 Page 1 of 1
APPLICATION NO. : 11/158665
DATED : February 3, 2009
INVENTOR(S) : Fulghum et al.

It is certified that error appears in the above-identified patent and that said Letters Patent is hereby corrected as shown below:

In Column 5, Line 15, delete "Rdmay" and insert -- Rd may --, therefor.

Signed and Sealed this

Second Day of June, 2009

JOHN DOLL
*Acting Director of the United States Patent and Trademark Office*